A. FOX.
Water-Filters.
No. 148,686.  Patented March 17, 1874.
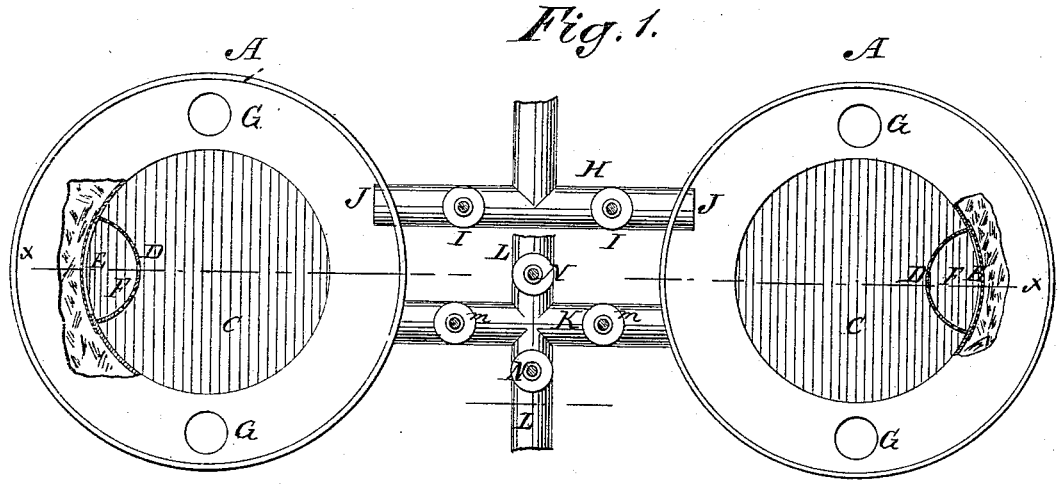
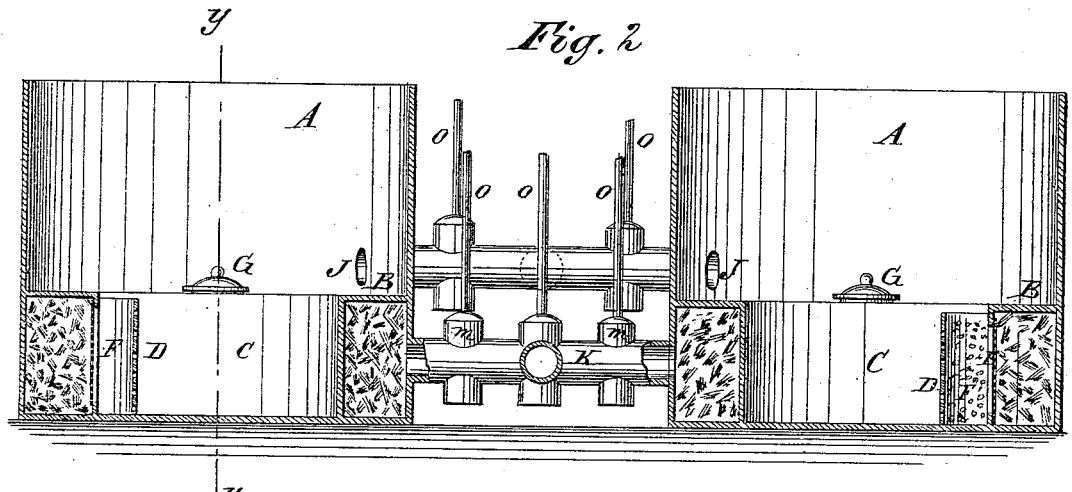
WITNESSES.  INVENTOR.

UNITED STATES PATENT OFFICE.

ALCANDER FOX, OF POUGHKEEPSIE, NEW YORK.

IMPROVEMENT IN WATER-FILTERS.

Specification forming part of Letters Patent No. 148,686, dated March 17, 1874; application filed February 7, 1874.

*To all whom it may concern:*

Be it known that I, ALCANDER FOX, of Poughkeepsie, in the county of Dutchess and State of New York, have invented a new and useful Improvement in Water-Filters, of which the following is a specification:

The invention will first be fully described, and then pointed out in the claim.

In the accompanying drawing, Figure 1 is a plan view. Fig. 2 represents a vertical section of Fig. 1, taken on the line $x\ x$. Fig. 3 is a vertical cross-section of Fig. 2 on the line $y\ y$.

Similar letters of reference indicate corresponding parts.

A A are two tanks or reservoirs, of any size, shape, or proportions, and formed of any suitable material. For filtering large quantities of water these reservoirs or vessels are preferably made of bricks or masonry, plastered with water-lime or water-proof cement. B is the filtering-chamber, which is annular in form, arranged in the lower angle of the reservoir A, leaving a central water-space, C. From this central space C the water enters the filtering-chamber through the screens D and E, the former being an open semicircular screen, of wire-cloth or other suitable material, attached to the front wall of the filtering-chamber over the screen E, which latter forms a part of the front wall of the chamber B. The semicircular space F forms a filtering-vessel of itself, which is filled, as well as the annular filtering-chamber B, with sand, gravel, charcoal, or other suitable filtering material. G are man-holes, which allow access to the filtering-chamber B, for filling or emptying the same. The water is introduced through the pipe H. This pipe is provided with valves I, by means of which the water may be shut off from either of the tanks or reservoirs A A. J J are the openings through which the pipe discharges. The water fills the spaces F, and may fill the tanks, and passes into the small chambers F and into the annular chamber B, having previously passed through two screens, by means of which the coarser foreign particles are strained and filtered from the water. K is a pipe which receives the filtered water from the chamber B, and L is the distributing-pipe, which supplies the service-pipes. M M are valves, by means of which the flow of water from either of the tanks may be shut off. N N are valves in the supply-pipe L. This pipe L discharges in opposite directions, for convenience in furnishing the supply to different localities. By the valves N N the flow of water is controlled.

All the valves mentioned may be made in any suitable manner. Those shown in the drawing operate by means of a vertical motion, but they may be made so as to operate by a rotary movement or otherwise, as may be deemed best. O represents the valve-rods.

This filter is designed to supply cities and villages with pure water. It is placed in an elevated position to insure a sufficient head for the distribution of the water.

The filter may be made double or single; but I prefer to make it double, as seen, as by cutting off the water from one tank or reservoir the other may be repaired, and the supply still kept up. By cutting off the flow from the induction-pipe H, and arranging the valves so that the water will flow from one tank to the other, thus reversing the flow through the empty tank, the tank may be cleaned without stopping the supply.

The health of community depends mainly upon a supply of pure and wholesome water; such water is supplied only to a limited extent, and when water is filtered the process is frequently imperfectly performed.

By my filter the water is thoroughly cleansed, all foreign and impure matter being removed in passing through the strainers and filtering material.

I do not confine myself to the precise form and arrangement shown, as variations may be made in various ways without departing from my invention.

Having thus described my invention, I claim as new and desire to secure by Letters Patent—

The apparatus consisting of reservoirs A A, having the filter-chamber B F, water-space C, and screens D E, the whole provided with supply and outlet pipes, each having two valves, as set forth, so that the water can be let into or out of the reservoirs separately or together.

ALCANDER FOX.

Witnesses:
 EGBERT Q. ELDRIDGE,
 GILBERT COOPER.